UNITED STATES PATENT OFFICE.

BRUNO RICHARD SEIFERT, OF RADEBEUL, GERMANY, ASSIGNOR TO DR. F. VON HEYDEN NACHFOLGER, OF SAME PLACE.

SUBSTITUTED SALOL.

SPECIFICATION forming part of Letters Patent No. 561,730, dated June 9, 1896.

Application filed October 19, 1895. Serial No. 566,224. (Specimens.) Patented in Germany September 14, 1892, No. 70,519, and in England March 30, 1893, No. 6,749.

*To all whom it may concern:*

Be it known that I, BRUNO RICHARD SEIFERT, of Radebeul, in the Kingdom of Saxony, in the German Empire, have invented certain new and useful Improvements in the Manufacture or Production of Salols, of which the following is a specification, and for which patents have been obtained in Germany, No. 70,519, dated September 14, 1892, and in Great Britain, No. 6,749, dated March 30, 1893.

In the specifications of United States Letters Patent granted to Marcel v. Nencki and myself, dated the 28th of September, 1886, No. 350,012, of United States Letters Patent granted to Carl Kolbe, dated the 31st of January, 1888, No. 377,311, and of United States Letters Patent granted to the same Carl Kolbe, dated the 12th of May, 1888, No. 383,306, various processes are described for the manufacture of the so-called "salols" with the employment of dehydrating agents. Now if in these processes, with the employment of salicylic acid, the phenols referred to therein be replaced by the substituted phenols or substitution phenols ortho, meta, and para chlor, brom and iodo phenol, asymmetric dichlor, dibrom, di-iodo phenol, and by trichlor, tribrom, tri-iodo phenol then, according to the present invention, substituted salols or salicylic-acid ethers will be obtained as new bodies. In the manufacture of these new salols dehydrating agents are employed, as before. Of such dehydrating agents several are mentioned in the specifications of said Letters Patent Nos. 350,012 and 383,306, such as chlorids or oxychlorids of phosphorus or of sulfur or acid sulfates of the alkalies. It may be mentioned that phosgen or thionylchlorid may also be used as a dehydrating agent. The substituted or substitution salols thus obtained have a greater therapeutic action than salol (salicylic-acid phenol or salicylate of phenol) heretofore obtained.

The mode of carrying out the present invention may be explained by the aid of the following example: To a mixture of one hundred and twenty-eight kilos of parachlorphenol and one hundred and thirty-eight kilos of salicylic acid, heated to a temperature of about 140° centigrade, there are added fifty-two kilos of phosphorus pentachlorid, which can, however, be replaced by other suitable dehydrating agent, the heating of the mixture being continued until the generation of hydrochloric acid has ceased. The product of the reaction is washed with water and with solution of soda and is then recrystallized from alcohol. In this manner there is obtained salicylate of parachlorphenol $$C_6H_4\begin{matrix}COOC_6H_4Cl\\OH\end{matrix}$$

in colorless crystals and having a melting-point of 73° centigrade.

In like manner there can be obtained from salicylic acid and the above-mentioned substituted or substitution phenols by the action of dehydrating agents, among others, the following substituted or substitution salols:

| Salicylate of— | | Melting-point. Centigrade. |
|---|---|---|
| 1. Othochlorphenol | $C_6H_4\begin{matrix}COOC_6H_4Cl\\OH\end{matrix}$ | 55° |
| 2. Metachlorphenol | $C_6H_4\begin{matrix}COOC_6H_4Cl\\OH\end{matrix}$ | 68° |
| 3. Parachlorphenol | $C_6H_4\begin{matrix}COOC_6H_4Cl\\OH\end{matrix}$ | 72° |
| 4. Orthobromphenol | $C_6H_4\begin{matrix}COOC_6H_4Br\\OH\end{matrix}$ | 88° |
| 5. Parabromphenol | $C_6H_4\begin{matrix}COOC_6H_4Br\\OH\end{matrix}$ | 72° |
| 6. Asymmetric dichlorphenol | $C_6H_4\begin{matrix}OH(2)Cl\\COO(1)C_6H_2(4)Cl\end{matrix}$ | 116° |
| 7. Asymmetric dibromphenol (1:2:4) | | 112° |
| 8. Trichlorphenol | (OH:Cl:Cl:Cl=1:2:4:6) | 130° |
| 9. Tribromphenol | (OH:Br:Br:Br=1:2:4:6) | 133° |
| 10. Tri-iodophenol | (OH:I:I:I=1:2:4:6) | 170° |
| 11. Ortholodophenol | $C_6H_4\begin{matrix}COOC_6H_4I\\OH\end{matrix}$ | 90° |
| 12. Paraiodophenol | $C_6H_4\begin{matrix}COOC_6H_4I\\OH\end{matrix}$ | 97° |
| 13. Di iodophenol | $C_6H_4\begin{matrix}COOC_6H_2I_2\\OH\end{matrix}$ | 121° |

Instead of salicylic acid and substituted phenols also the salts of such acid and phenols may be used as equivalents.

The new compounds are colorless, soluble in alcohol, and insoluble in water. With solution of soda they form salts according to the formula:

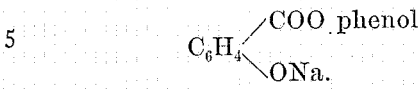

When boiled with alkalies, saponification sets in. The new substances mentioned form very effective medicines, that are distinguished from the corresponding chlorin, bromin, or iodin phenols more particularly by their want of smell and by their want of or weak taste.

What I claim as my invention is—

1. The process of making substituted salols which consists in first mixing a substituted phenol and salicylic acid and heating the mixture, next adding to the mixture a dehydrating agent and continuing the heating until the generation of hydrochloric acid has ceased, afterward washing the product of this reaction with water and with solution of soda and finally recrystallizing it from alcohol, substantially as herein described.

2. The new substituted salols, herein described, having the following properties, solid, crystalline, colorless, without smell, soluble in alcohol, insoluble in water, forming alkaline salts with a solution of caustic soda, being decomposed into salicylic acid and substituted phenols by hot alkaline lye and having the melting-points from 55° to 170° centigrade.

In testimony that I claim the foregoing as my invention I have signed my name in presence of two subscribing witnesses.

BRUNO RICHARD SEIFERT.

Witnesses:
 HERNANDO DE SOTO,
 PAUL ARRAS.